United States Patent [19]

Hoetger et al.

[11] 4,154,118

[45] May 15, 1979

[54] TRANSMISSION SPEEDOMETER DRIVE ASSEMBLY

[75] Inventors: Robert A. Hoetger, St. Clair Shores; James R. Klotz, Sterling Heights, both of Mich.

[73] Assignee: Chrysler Corporation, Highland Park, Mich.

[21] Appl. No.: 833,418

[22] Filed: Sep. 15, 1977

[51] Int. Cl.² .................. F16H 37/02; F16B 1/00; F16D 1/06
[52] U.S. Cl. ........................... 74/12; 403/317; 403/377
[58] Field of Search ............ 74/12; 403/316, 317, 403/321, 377, 155; 267/164; 29/436, 437

[56] References Cited

U.S. PATENT DOCUMENTS

| 1,650,125 | 11/1927 | Gustafson | 74/12 |
|---|---|---|---|
| 1,782,196 | 11/1930 | Dalton | 403/321 |
| 2,793,532 | 5/1957 | Johnson et al. | 74/12 |
| 3,129,476 | 4/1964 | Sindlinger | 403/377 |
| 3,247,729 | 4/1966 | Stadelmann | 74/12 |
| 3,638,161 | 5/1972 | Jones | 29/436 |
| 3,938,395 | 2/1976 | Henecke | 74/12 |
| 3,964,321 | 6/1976 | Katayama et al. | 74/12 |

FOREIGN PATENT DOCUMENTS 764269  12/1956  United Kingdom .............. 74/12

Primary Examiner—Samuel Scott
Assistant Examiner—William R. Henderson
Attorney, Agent, or Firm—Baldwin & Newtson

[57] ABSTRACT

A speedometer drive assembly for use with an automotive transmission includes an adapter housing for securing the assembly to a transmission housing, a rotatable take-off gear received in the adapter housing and engageable with a geared output shaft of the transmission, a cable drive assembly operatively connectable to a speedometer and received in the take-off gear to a position drivingly engaging the take-off gear, and fastener means operative to retain the take-off gear in the adapter housing in a position wherein meshing engagement with the transmission output shaft is effected and to lockingly retain the cable drive assembly in the adapter housing.

11 Claims, 4 Drawing Figures

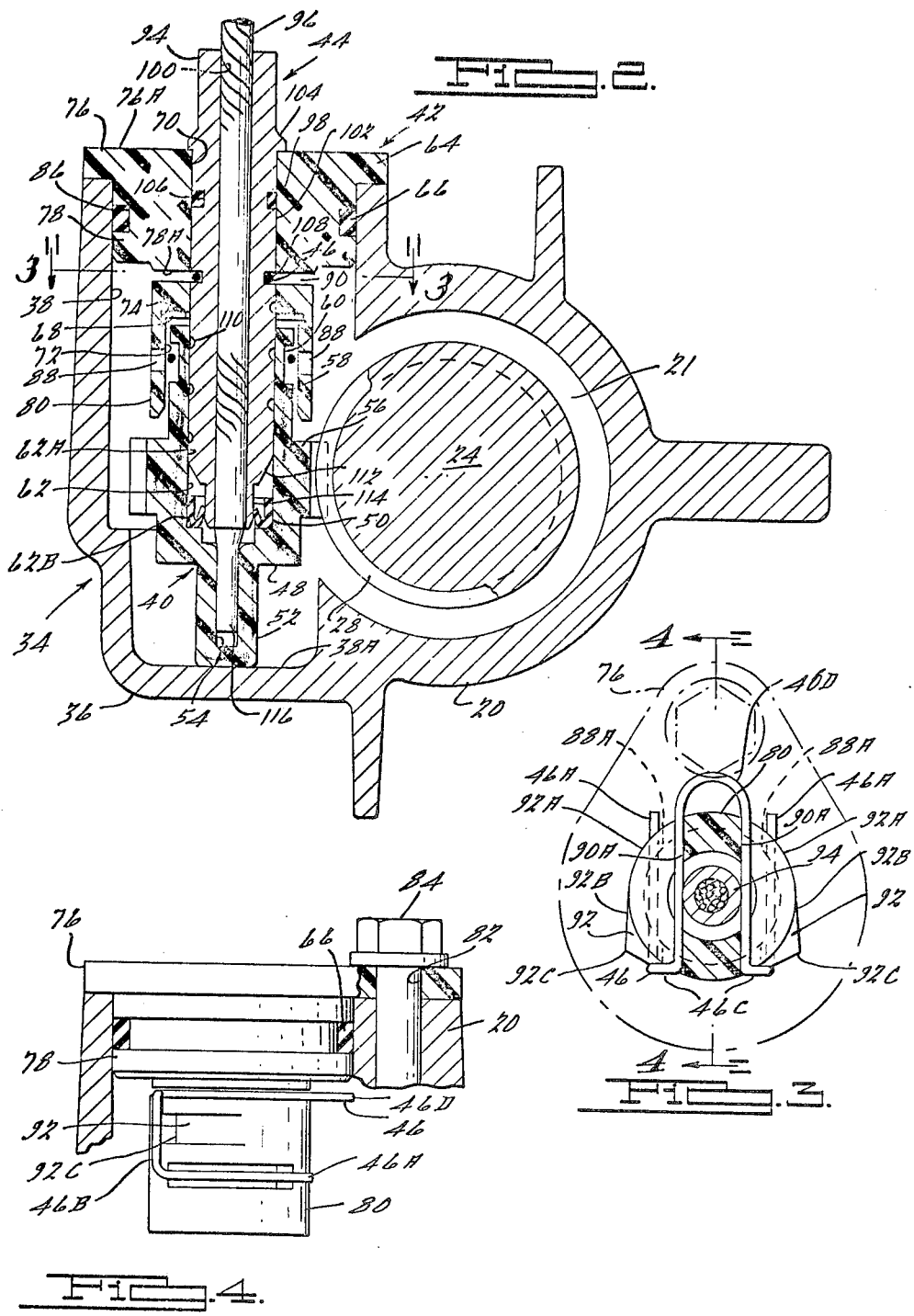

TRANSMISSION SPEEDOMETER DRIVE ASSEMBLY

BACKGROUND OF THE INVENTION

1. Field of the Invention

The present invention relates generally to automotive transmissions and more specifically to speedometer drive assemblies therefor.

2. Description of the Prior Art

It is well known to provide a speedometer cable drive assembly for an automotive transmission that generally includes some type of gear member which engages an output gear of the transmission and rotatively drives a speedometer cable. Known assemblies, however, require the use of a multiplicity of parts which employ a large number of relatively expensive fastening elements to hold them together prior to assembly with the transmission and to attach the fastened drive assembly to the transmission.

SUMMARY OF THE INVENTION

Responsive to the disadvantages of the prior art transmission driven speedometer drive assemblies, it is the primary object of the present invention to provide a simple, inexpensive speedometer drive assembly for use with an automotive transmission.

It is another object to provide a speedometer drive assembly that employs a minimal number of parts for retaining the drive assembly to the transmission.

It is further object to provide a speedometer drive assembly for an automotive transmission which permits simple, economical assembly.

According to one feature of the present invention, a speedometer drive assembly is provided for an automotive transmission which includes an adapter housing for securing the drive assembly to a transmission, a take-off gear received in the adapter housing and engageable with a geared output shaft of the transmission, a cable drive assembly operatively connectable with a speedometer and received in the take-off gear for driving engagement therewith, and unitary retaining means operative to retain the take-off gear to the adapter housing and to retain the cable drive assembly in the adapter housing.

BRIEF DESCRIPTION OF THE DRAWINGS

These and other objects and features will become apparent to those skilled in the art upon reading the following detailed description with reference to the accompanying drawings in which:

FIG. 2 is an enlarged cross sectional view of the speedometer drive assembly of the present invention.

FIG. 3 is a partial sectional view taken along line 3—3 of FIG. 2 and having a portion of the adapter housing shown out of position; and FIG. 4 is a partial sectional view taken along line 4—4 of FIG. 3.

DESCRIPTION OF THE PREFERRED EMBODIMENT

Figure 1:
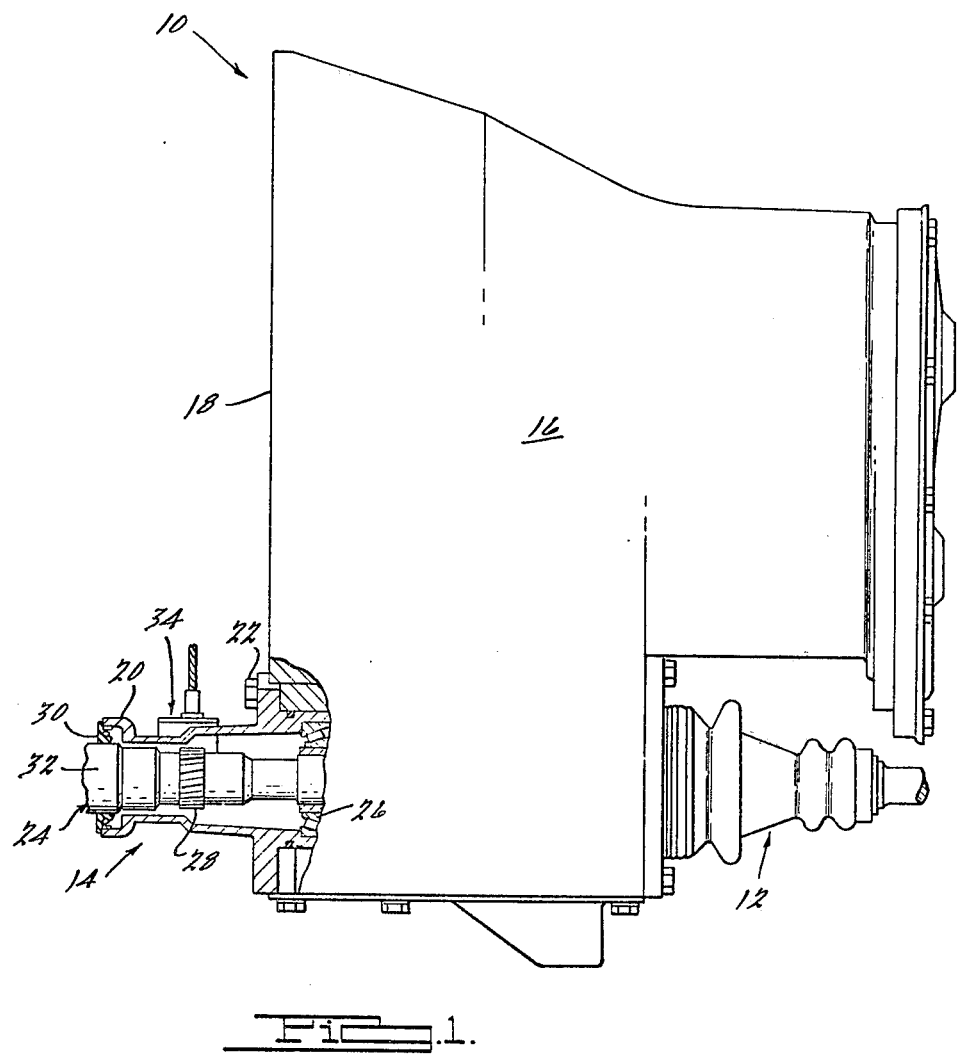
FIG. 1 is a partially cross sectioned view of an automotive transmission embodying the speedometer drive assembly of the present invention.

Referring now to FIG. 1 an automotive transmissiom 10 is illustrated as including an input section 12 which may be drivingly connected to an engine (not shown), an output section 14, which may be drivingly connected to a vehicle wheel drive system (not shown), and a power transmission section 16 whereby the transfer of power from the input section 12 to the output section 14 is controlled in a known manner.

The transmission section includes a main housing 18, and the output section 14 includes an extension housing 20 secured to the main housing 18 by suitable fasteners such as the bolts 22 (one shown). The extension housing 20 defines an internal cavity 21 communicating internally with the main housing 18 which is flooded with transmission fluid in a known manner.

The output section 14 is illustrated as further including an output shaft 24 preferably supported by antifriction bearings 26 (one shown), and having a portion defining a gear 28. It should be understood, however, that the gear portion 28 is not necessarily integrally formed with the shaft 24, but may be a separate part. A shaft seal 30 carried in the extension housing 20 engages an outboard portion 32 of the output shaft 24 to seal the cavity 21 from the atmosphere.

Secured to the extension housing 20 adjacent the output shaft geared portion 28 is an improved speedometer drive assembly 34.

Turning now to FIG. 2 it can be seen that the extension housing 20 includes a speedometer drive boss 36 having a stepped blind bore 38 extending perpendicular to the axis of the shaft 24 for receiving the speedometer drive assembly 34 and which intersects the internal cavity 21.

The speedometer drive assembly 34 includes generally a take-off gear assembly 40, an adapter housing assembly 42, a cable drive assembly 44, and a retainer clip 46.

The take-off gear assembly 40 consists of a pinion gear member 48, preferably formed as a molded plastic part, and a lip seal member 50. The pinion gear member 48 has a generally cylindrical configuration and includes a reduced diameter drive section 52, which is positioned adjacent the bottom wall 38A of the bore 38 as viewed in FIG. 2 and which has a preferably square drive pocket 54 formed therein. The pinion gear member 48 also includes an integrally formed gear portion 56, drivingly engaging the gear portion 28 of the output shaft 24, and a pilot portion 58. An annular groove 60 is formed in the pilot portion 58 proximate its upper end as viewed in FIG. 2.

A central bore 62 is formed through the pilot portion 58 and the gear portion 56 coaxial with and intersecting the drive pocket 54 and includes a smooth bearing portion 62A terminating in a shoulder 62B for positioning the lip seal 50 which is preferably secured to the pinion gear member 48 by adhesive bonding or like process.

Turning now to the adapter housing assembly 42, it is illustrated as including an adapter housing member 64, a static seal 66, and a thrust washer 68.

The adapter housing member 64, similar to the pinion gear member 48, is also preferably formed as a plastic molded part. It includes a centrally located through bore 70 and an axially aligned enlarged pilot bore 72 for rotatively receiving the upper end (as viewed in FIG. 2) of pinion gear member pilot portion 58. Thrust washer 68 is also received in a groove 74 formed at the inner end of the pilot bore 72.

The adapter housing member 64 is externally configured to define a generally triangular mounting flange portion 76 (as may best be seen in FIG. 3), a cylindrical sealing portion 78, and a generally cylindrical pinion retaining portion 80.

The mounting flange portion 76 includes a clearance hole 82 (as may be seen in FIG. 4) extending through it parallel to the through bore but offset therefrom for receiving a suitable fastener such as a bolt 84 for engagement with the extension housing 20.

The sealing portion 78 is sized for sliding insertion in the bore 38 of the extension housing speedometer boss 36 and includes an annular groove 86 for receiving the static seal 66.

The pinion retaining portion 80 is of substantially less cross sectional area than the sealing portion 78, providing large diametrical clearance within the bore 36. A first symmetrical pair of straight chordal slots 88 are formed through the retaining portion 80 extending normal to the axis of the pilot bore 72 and being formed to a depth defining under surfaces 88A (as may best be seen in FIG. 3) symmetrically located with respect to the through bore 70 and spaced radially outwardly therefrom a predetermined amount. It should be understood and will later become clear that the slots 88, which are illustrated as being relatively narrow, may in practice actually extend downwardly to the end of the end of the adapter housing 64. A second symmetrical pair of straight chordal slots 90 is formed through the retaining portion 80 to a depth defining inner surfaces 90A symmetrically located with respect to the through bore 70 and spaced radially inwardly therefrom a predetermined amount.

Also formed on the retaining portion 80, as may best be seen in FIGS. 3 and 4 are a pair of ramps 92, symmetrically located with respect to the through bore 70 and positioned axially intermediate the pairs of slots 88, 90.

Turning now to the cable drive assembly 44, it is illustrated in FIG. 2 as including a ferrule 94, a speedometer drive cable 96, and a static seal 98. The ferrule 94 is a generally cylindrical member, preferably formed of a metal and having an axially extending through bore 100. Its outer surface 102 is sized to be slidingly received in a through bore 70 of adapter housing 64 and the central bore 62 of pinion gear member 48. A flange 104 is formed extending outwardly from the outer surface 102 proximate one end of the ferrule 94 for abuttingly engaging the top surface 76A (as viewed in FIG. 2) of flange portion 76. A first annular groove 106 for receiving the static seal 98 is formed in the outer surface 102 at an axial position registering with a portion of the through bore 70 when installed to the position shown in FIG. 2.

A second annular groove 108 for receiving a portion of the retainer 46 is formed in the outer surface 102 at an axial position adjacent the lower end 78A of adapter housing sealing portion 78 when installed to the position shown in FIG. 2.

Also formed in the outer surface 102 is a spiral groove 110 terminating at its upper end proximate the groove 108 and at its lower end proximate a tapered surface 112 formed to aid insertion of the ferrule 94 into the bores 70, 62.

Adjacent the tapered surface 112 is a smooth reduced diameter section 114 which engages the lip seal 50 when the ferrule 94 is installed to the position shown in FIG. 2.

The drive cable 96 is slidingly received in the bore 100 and preferably includes a square drive portion 116 at its inner end for insertion in the drive pocket 54 of pinion member 52.

Referring now to FIGS. 3 and 4 where the retainer clip 46 is best illustrated, the simple economical assembly of the drive assembly 34 into the transmission 10 may be easily understood. The retainer clip 46 is a flexible unitary structure preferably formed from round wire. It includes a pair of spaced parallel pinion retaining legs 46A, a pair of connecting struts 46B extending perpendicularly therefrom, a pair of inwardly extending positioning arms 46C, and a U-shaped ferrule retaining portion 46D.

To assemble the speedometer drive assembly in the transmission 10, the following procedure is preferred. First, pilot section 58 of pinion gear assembly 40 is inserted in the pilot bore 72 of adapter housing assembly 42. Next, the retainer clip 46 is positioned such that the open end of ferrule retaining portion 46D and the struts 46B are adjacent the narrower end 92A of ramps 92 and the pinion retaining legs 46A register with the first pair of chordal slots 88 and the ferrule retaining portion 46D registers with the second pair of chordal slots 90. The retainer clip is then pushed inward with respect to the adapter housing 64, being spread apart as the struts 46B engage the outward extending surfaces 92B of ramps 92 until the struts 46B clear edges 92C and permit the retainer clip 46 to snap back to the position shown.

This procedure effects loose retention of the pinion gear assembly 40 to the adapter housing assembly 42 as the retaining legs 46A assume the position shown in FIG. 2 projecting into the groove 60 of pinion gear member pilot portion 58 to prevent removal of the pinion gear member 52 from the adapter housing member 64. This facilitates assembly of the joined adapter housing assembly 42 and the take-off gear assembly 40 into the bore 36 of the extension housing 20, which is typically oriented in the upward opening attitude illustrated in FIG. 2.

When so assembled, the pinion gear member 52 bottoms on the surface 38A and the geared portion 56 of pinion gear member 48 meshes with the geared portion 28 of the output shaft 24. The adapter housing member 64 is then secured to the extension housing 20 by the bolt 84.

It is the preferred practice in assembling automobiles at this point that the transmission 10 be secured to an engine (not shown) and that engine and transmission together be assembled to a vehicle chassis (not shown).

At this point the advantageous construction above described permits the final installation of the cable drive assembly 44, which is connectable to a vehicle speedometer (not shown) to be simply effected. The cable drive assembly 44 is simply inserted into the assembled transmission 10 through the bore 70 of adapter housing 64. Tapered surface 112 engages the sides of ferrule retaining portion 46D of retainer clip 46 to again spread the clip 46 slightly outward to the spacing defined by the outer surface 102 of ferrule 94 where it is maintained until insertion to the position of FIG. 2 is completed and the clip 46 snaps into the groove 108 to prevent axial removal.

With the speedometer drive assembly so installed, rotation of the transmission output shaft 24 is picked up by the geared portion 56 of take-off gear assembly 40 and transmitted through the drive pocket 54 to the cable 96 to operate the speedometer. The ferrule 94 remains stationary, being lubricated at its interface with the bore 62 of pinion gear member 52 by transmission fluid supplied through spiral groove 110. Leakage of transmission fluid to the through bore 100 is prevented by the lip seal 50.

While only one embodiment of the invention speedometer drive assembly has been described, others are possible without departing from the scope of the appended claims.

What is claimed is:

1. A drive assembly for the speedometer of an engine driven vehicle having a transmission operatively connected to the engine, the transmission including a housing and an output shaft mounted for rotation in the housing, the drive assembly comprising:

adapter housing means including means defining a bore therethrough adapted to be received in said transmission housing adjacent said transmission output shaft;

rotatable take off means received in said adapter housing for rotation about the axis of said through bore, having an axially extending bore formed therein in alignment with said adapter housing through bore, and adapted to be drivingly engaged with said transmission output shaft;

speedometer drive means including ferrule means insertable through said adapter housing means through bore and into said take off means bore for rotatively supporting said take off means and a drive cable drivingly engageable with said take off means and adapted to be rotatingly drivingly engaged with said vehicle speedometer; and a unitary retainer operative to:

loosely axially retain said take off means to said adapter housing means for assembly of said adapter housing means and said take off means with said transmission housing; and receive in snap fit relationship and lockingly retain said speedometer drive means to said adapter housing means upon insertion of said speedometer drive ferrule means to a predetermined axial position in said through bore.

2. In a transmission for an engine driven vehicle having a speedometer mounted in the vehicle and wherein the transmission is operatively connected between the engine and the wheel drive of the vehicle and includes an output shaft having a geared portion and housing encompassing the geared portion, a speedometer drive assembly comprising:

A. generally cylindrical adapter housing means adapted to be inserted for sealing engagement with said transmission housing adjacent said output shaft geared portion and including means defining an axially extending through bore having a pilot portion extending from the inner end thereof and a sealing portion;

B. pinion gear means having a cylindrical pilot portion rotatively received in said adapter housing through bore pilot portion and an axial extending bore formed therein in alignment with said adapter housing through bore and adapted to drivingly engage said output shaft geared portion;

C. a cable drive assembly including substantially cylindrical ferrule means insertable through said adapter housing through bore sealing portion and into said pinion gear bore for rotatively supporting said pinion gear means, and drive cable means drivingly engageable with said pinion gear means and adapted to drivingly engage said speedometer; and D. a one-piece retainer member for axially retaining said adapter housing means, said pinion gear means, and said cable drive assembly together as a unitary assembly and operative to:

(1) retain said pinion gear means to said adapter housing means to permit insertion of said adapter housing means and said pinion gear means into said transmission housing to an assembled position wherein said adapter housing means sealingly engages said transmission housing and said pinion gear means drivingly engages said output shaft geared portion; and (2) upon insertion of said cable drive ferrule means through said adapter housing through bore into said pinion gear bore to a predetermined axial position, receive in snap fit relationship and lockingly retain said cable drive assembly to said adapter housing means.

3. A speedometer drive assembly as defined in claim 2 and further comprising:

E. means defining a first circumferentially extending groove in said pinion gear pilot portion;

F. means defining a second circumferentially extending groove in said cable drive assembly ferrule means;

G. means defining a first pair of chordal slots extending through said adapter housing means to intersect said through bore pilot portion at an axial position registering with said first groove;

H. means defining a second pair of chordal slots extending through said adapter housing means to intersect said through bore sealing portion at an axial position registering with said second groove; and I. wherein said one-piece retainer member comprises a resilient clip member engaging said adapter housing means in a snap-fit relationship and having first portions engaging said first pairs of slots to project into said first groove to retain said pinion gear means to said adapter housing means and second portions engaging said second pairs of slots to project into said cable drive assembly ferrule groove to retain said cable drive assembly to said adapter housing means.

4. In a transmission for an engine driven vehicle having a speedometer mounted in the vehicle and wherein the transmission is operatively connected between the engine and the wheel drive of the vehicle and includes an output shaft having a geared portion and a housing encompassing the geared portion and having a blind bore extending through a wall of the housing generally perpendicularly to the axis of the output shaft, a speedometer drive assembly comprising:

A. generally cylindrical pinion gear means having:

(1) an external gear portion adapted to be engaged with said transmission output shaft geared portion;

(2) a cylindrical pilot portion positioned axially adjacent said external gear portion; and (3) means defining a central blind cavity having a bearing bore portion extending through the pilot portion inwardly from the open end thereof and a drive pocket;

B. generally cylindrical adapter housing means having:

(1) a cylindrical sealing portion adapted to be sealingly received in said blind bore;

(2) a substantially cylindrical pinion retaining portion extending axially from said sealing portion; and (3) means defining an axially extending through bore having a reduced diameter portion extending axially through said sealing portion and a coaxial pilot portion sized to rotatively receive said pinion gear member pilot portion;

C. a cable drive assembly including:
   (1) a substantially cylindrical ferrule member having:
      a. an outer diameter sized for sliding insertion through said adapter housing through bore reduced diameter portion to a position rotatably received in said pinion gear means bearing bore portion; and
      b. a central through bore; and
   (2) a rotatable drive cable slidingly received in said ferrule through bore, having a drive portion drivingly engageable with said pinion gear means drive pocket and adapted to rotatively drivingly engage said speedometer; and D. a unitary retainer member for axially retaining said pinion gear means, said adapter housing means, and said cable drive assembly together as a unitary assembly and operative to:
   (1) retain said pinion gear means to said adapter housing means whereby upon insertion of said adapter housing means into said transmission housing blind bore, said pinion gear means may be drivingly engaged with said output shaft; and
   (2) receive in snap-fit relationship and lockingly retain said ferrule member to said adapter housing means upon insertion of said cable drive assembly into said pinion gear means bearing bore portion to an assembled position wherein said cable drive portion drivingly engages said pinion gear drive pocket.

5. A speedometer drive assembly as defined in claim 4 and further comprising:

E. means defining a circumferentially extending groove in said pinion gear pilot portion;

F. means defining a circumferentially extending groove in said ferrule memeber outer diameter, axially positioned to be adjacent the inner end of said adapter housing sealing portion when said ferrule member is inserted to said assembled position;

G. means defining a first pair of centrally located chordal slots extending through said adapter housing pinion retaining portion at an axial position registering with said pinion gear groove;

H. means defining a second pair of chordal slots extending through said adapter housing pinion retaining portion extending parallel to but axially spaced from said first pair of slots a distance effecting registration of said slots with said ferrule member groove in said assembled position; and I. wherein said unitary retainer member comprises a resilient clip member having first portions engaging said first pair of slots thereby projecting into said pinion gear groove to retain said pinion gear member to said adapter housing and second portions engaging said second pair of slots thereby projecting into said ferrule member groove to retain said ferrule member to said adapter housing.

6. A speedometer drive assembly as defined in claim 5 wherein said one piece resilient clip member comprises:
   (1) a pair of spaced parallel pinion retaining legs;
   (2) a U-shaped ferrule retaining portion extending parallel to but spaced from said pinion retaining legs a distance substantially equal to the axial spacing of said first and second pairs of chordal slots; and
   (3) portions connecting the open end of said ferrule retaining legs whereby said clip may be inserted in a direction normal to the axis of said adapter housing pinion retaining portion to a position engaging said first and second pairs of chordal slots.

7. A speedometer drive assembly as defined in claim 6 wherein said adapter housing further comprises a pair of inclined ramp surfaces extending radially outwardly from the outer diameter of said pinion retaining portion and terminating in a pair of locking shoulders for lockingly engaging said clip member retaining portions upon insertion of said clip member to said slot engaging position.

8. In a transmission for an engine driven vehicle having a speedometer mounted in the vehicle and wherein the transmission is operatively connected between the engine and the wheel drive of the vehicle and includes an output shaft having a geared portion and housing encompassing the geared portion, a speedometer drive assembly comprising:

A. generally cylindrical adapter housing means adapted to be inserted for sealing engagement with said transmission housing adjacent said output shaft geared portion and including means defining an axially extending through bore having a pilot portion extending from the inner end thereof and a sealing portion;

B. pinion gear means having a cylindrical pilot portion rotatively received in said adapter housing through bore pilot portion and adapted to drivingly engage said output shaft geared portion;

C. a cable drive assembly insertable through said adapter housing through bore sealing portion to drivingly engage said pinion gear means and adapted to drivingly engage said speedometer;

D. means defining a first circumferentially extending groove in said pinion gear pilot portion;

E. means defining a second circumferentially extending groove in a portion of said cable drive assembly;

F. means defining a first pair of chordal slots extending through said adapter housing means to intersect said through bore pilot portion at an axial position registering with said first groove;

G. means defining a second pair of chordal slots extending through said adapter housing means to intersect said through bore sealing portion at an axial position registering with said second groove; and H. a one-piece retainer member for axially retaining said adapter housing means, said pinion gear means, and said cable drive assembly together as a unitary assembly comprising a resilient clip member engaging said adapter housing means in a snap-fit relationship and having first portions engaging said first pairs of slots to project into said first groove to retain said pinion gear means to said adapter housing means and second portions engaging said second pairs of slots to project into said cable drive assembly to said adapter housing means.

9. In a transmission for an engine driven vehicle having a speedometer mounted in the vehicle and wherein the transmission is operatively connected between the engine and the wheel drive of the vehicle and includes an output shaft having a geared portion and a housing encompassing the geared portion and having a blind bore extending through a wall of the housing generally perpendicularly to the axis of the output shaft, a speedometer drive assembly comprising:

A. generally cylindrical pinion gear means having:
  (1) an external gear portion adapted to be engaged with said transmission output shaft geared portion;
  (2) a cylindrical pilot portion positioned axially adjacent said external gear portion;
  (3) means defining a central blind cavity having a bearing bore portion extending through the pilot portion inwardly from the open end thereof and a drive pocket; and
  (4) means defining a circumferentially extending groove in said pinion gear pilot portion.

B. generally cylindrical adapter housing means having:
  (1) a cylindrical sealing portion adapted to be sealingly received in said blind bore;
  (2) a substantially cylindrical pinion retaining portion extending axially from said sealing portion;
  (3) means defining an axially extending through bore having a reduced diameter portion extending axially through said sealing portion and a coaxial pilot portion sized to rotatively receive said pinion gear member pilot portion;
  (4) means defining a first pair of centrally located chordal slots extending through said adapter housing pinion retaining portion at an axial position registering with said pinion gear groove;
  (5) means defining a second pair of chordal slots extending through said pinion retaining portion extending parallel to but axially spaced from said first pair of slots;

C. a cable drive assembly including:
  (1) a substantially cylindrical ferrule member having:
    a. an outer diameter sized for sliding insertion through said adapter housing through bore reduced diameter portion to a position rotatably received in said pinion gear means bearing bore portion;
    b. a central through bore; and
    c. means defining a circumferentially extending groove in said ferrule member outer diameter, axially positioned to be adjacent the inner end of said adapter housing sealing portion when said ferrule member is inserted to said assembled position and registering with said second pair of chordal slots; and
  (2) a rotatable drive cable slidingly received in said ferrule through bore, having a drive portion drivingly engageable with said pinion gear means drive pocket and adapted to rotatively drivingly engage said speedometer; and D. a unitary retainer member for axially retaining said pinion gear means, said adapter housing means, and said cable drive assembly together as a unitary assembly and operative to:
  (1) retain said pinion gear means to said adapter housing means whereby upon insertion of said adapter housing means into said transmission housing blind bore, said pinion gear means may be drivingly engaged with said output shaft; and
  (2) lockingly retain said ferrule member to said adapter housing means upon insertion of said cable drive assembly into said pinion gear means bearing bore portion to an assembled position wherein said cable drive portion drivingly engages said pinion gear drive pocket.

10. A speedometer drive assembly as defined in claim 9 wherein said one piece resilient clip member comprises:

A. a pair of spaced parallel pinion retaining legs;
B. a U-shaped ferrule retaining portion extending parallel to but spaced from said pinion retaining legs a distance substantially equal to the axial spacing of said first and second pairs of chordal slots; and
C. portions connecting the open end of said ferrule retaining legs whereby said clip may be inserted in a direction normal to the axis of said adapter housing pinion retaining portion to a position engaging said first and second pairs of chordal slots.

11. A speedometer drive assembly as defined in claim 10 wherein said adapter housing further comprises a pair of inclined ramp surfaces extending radially outwardly from the outer diameter of said pinion retaining portion and terminating in a pair of locking shoulders for lockingly engaging said clip member retaining portions upon insertion of said clip member to said slot engaging position.

* * * * *